United States Patent [19]
Yoshida

[11] 4,218,673
[45] Aug. 19, 1980

[54] PATTERN MATCHING METHOD AND SUCH OPERATION SYSTEM

[75] Inventor: Hajime Yoshida, Chofu, Japan

[73] Assignee: Hajime Industries, Ltd., Tokyo, Japan

[21] Appl. No.: 846,212

[22] Filed: Oct. 27, 1977

[51] Int. Cl.² ............................................. G06K 9/12
[52] U.S. Cl. .................. 340/146.3 MA; 340/146.3 F; 340/146.3 Y
[58] Field of Search ............. 340/146.3 Y, 146.3 MA, 340/146.3 AC, 146.3 AQ, 146.3 F, 146.3 H

[56] References Cited

U.S. PATENT DOCUMENTS

| | | | |
|---|---|---|---|
| 3,165,718 | 1/1965 | Fleisher | 340/146.3 Y |
| 3,192,505 | 6/1965 | Rosenblatt | 340/146.3 AG |
| 3,560,930 | 2/1971 | Howard | 340/146.3 H |
| 3,597,731 | 8/1971 | Reitboeck et al. | 340/146.3 H |
| 3,727,184 | 4/1973 | Roza et al. | 340/146.3 H |
| 3,790,955 | 2/1974 | Klemt | 340/146.3 MA |
| 3,795,894 | 3/1974 | Klemt | 340/146.3 MA |
| 3,858,180 | 12/1974 | Spanjersberg | 340/146.3 F |
| 3,959,771 | 5/1976 | Uno et al. | 340/146.3 Y |
| 4,134,021 | 1/1979 | Klemt | 340/146.3 MA |

OTHER PUBLICATIONS

Buyle-Bodin et al., "A Letter Encoder . . . ," Proceedings of the Conf. on Machine Perception of Patterns & Pictures, England, Apr. 1972, pp. 216-222.
Cork et al., "Programming Approach to Pattern Rec.," IBM Tech. Disclosure Bulletin, vol. 18, No. 4, Sep. 1975, pp. 1182-1184.

Primary Examiner—Leo H. Boudreau
Attorney, Agent, or Firm—Thomas R. Morrison

[57] ABSTRACT

A pattern matching method for recognizing a pattern projected on a picture screen consisting of a plurality of picture elements by scanning the screen in which the plurality of picture elements are divided into a plurality of picture element groups, each group consisting of a plurality of picture elements, a sum of informations within each of the plural picture element groups is obtained, and the total sum of the information amounts of the picture element groups are used to represent the pattern on the picture screen.

An apparatus for carrying out the above method having a picture screen on which a pattern to be recognized is projected, the screen consisting of a plurality of picture element groups, each group including a plurality of picture elements, a device which scans the screen to produce a sum of information amounts of each of the plurality of picture element groups, and a circuit device which produces a line or series information based on the sums of the informations of the plural picture element groups.

12 Claims, 5 Drawing Figures

| Group \ Figure | 2 | 3 |
|---|---|---|
| A | 5 | 5 |
| B | 1 | 1 |
| C | 2 | 5 |
| D | 4 | 1 |
| E | 1 | 2 |
| F | 6 | 5 |

PATTERN MATCHING METHOD AND SUCH OPERATION SYSTEM

BACKGROUND OF THE INVENTION

1. Field of the Invention

This invention relates generally to a pattern matching method, and more particularly to a novel pattern matching method in which, upon achieving a pattern matching by scanning a picture screen consisting of a plurality of picture elements arranged, for example, in row and column directions, information of a pattern to be recognized is compressed to perform a superior pattern matching.

This invention relates also to an apparatus for carrying out the above pattern matching method.

2. Description of the Prior Art

In prior art pattern recognition techniques, a pattern such as a letter, picture image or the like on a two dimensional picture screen is divided into a number of picture elements which are arranged in a matrix. An electrical signal or information corresponding to the light image of a pattern, which is to be recognized and projected on the screen, is produced from the picture elements in response to the pattern, and correlation between the extracted electric signal and a basic or reference electrical signal or information provides the pattern recognition.

In this case, various arrangements to convert the light intensity projected onto the picture elements into an electrical amount are known in the art, such as use of rotary discs, utilizing spot scanners, using pickup tubes, single line or two dimensional arrangement of photoelectric elements, etc. Further, as for the methods of scanning, various methods are known such as: (1) sequential scanning like a television camera, (2) right angled direction scanning of a single or a plurality of photo-electric elements, and (3) a parallel data extraction method from a two dimensional matrix of photoelectric elements, etc.

Now, supposing that the scanning time per element is constant, the total element scanning time is naturally longer in the sequence of the above methods (3), (2) and (1) in that order. That is, in the case of simultaneous parallel processing as method (3) above, the scanning time can be the shortest, but special circuitry is required to simultaneously process the data from each picture element, so that the circuitry becomes complicated. Accordingly, in the case that the number of picture elements, which are arranged in matrix, are limited to a small number such as for optical character reading, the above mentioned method (3) can be placed into practice. However, when a number of picture elements become involved such as the case of pattern recognition, the realization of the method (3) accompanies extreme difficulties.

OBJECT AND SUMMARY OF THE INVENTION

Accordingly, a main object of this invention is to provide a pattern matching method which can be placed into a practice with a simple construction and to present such an operation system.

According to an aspect of the invention there is provided a pattern matching method for recognizing a pattern consisting of a plurality of picture elements projected on a picture screen by scanning the screen which comprises the steps of dividing a plurality of picture elements into a plurality of picture element groups, each group consisting of a plurality of picture elements, finding the sum of information amounts in each of the plural picture groups, and using the total sum of the information amounts of all of the picture element groups to represent the pattern projected on the screen.

Further, an apparatus for carrying out the above method is provided, the apparatus having a picture screen on which a pattern to be recognized is projected, the screen consisting of a plurality of picture element groups, each group including a plurality of picture elements, a device which scans the screen to produce a sum of information amounts of each of the plurality of picture element groups, and a circuit device which produces a line or series information based upon the sums of the information in the plural picture element groups.

The additional, and other objects, features and advantages of this invention will become apparent from the following description taken in conjunction with the accompanying drawings.

DESCRIPTION OF THE PREFERRED EMBODIMENTS

Details of an example of this invention will be explained hereunder with reference to the drawings.

Figures 1A, 1B, 2, 4:
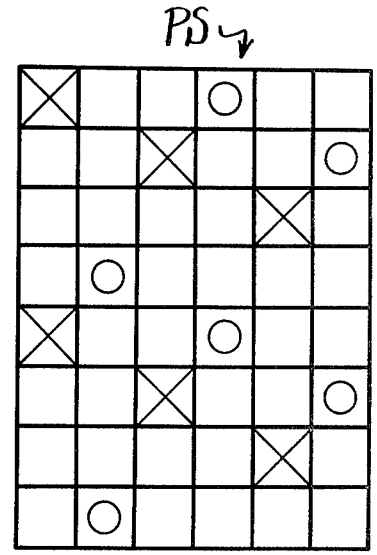
FIGS. 1A and 1B are plan views of the photo-electric convertible picture screen according to this invention.
FIG. 2 is a table showing information amounts obtained from the picture screen of FIG. 1.
FIG. 4 is a plan view showing another example of the photo-electric convertible picture screen according to this invention.

FIGS. 1A and 1B illustrate a picture screen PS according to this invention. Such picture screen PS contains a plurality of photo-electric convertible elements (picture elements). The example illustrated on FIGS. 1A and 1B is constructed by arranging the substantially same picture elements attached to each other with 8 pcs vertically or in column direction and 6 pcs horizontally or in row direction to form the picture screen PS of matrix at which 6 picture element groups A, B, C, D, E and F are formed with each containing 8 picture elements. In order words, the 6 picture element groups A to F contain 8 picture elements such as A1-A8, B1-B8, C1-C8, D1-D8, E1-E8 and F1-F8, respectively.

Now, on the picture screen PS of FIG. 1A, the figure "2" is projected as indicated with the cross hatched elements, while the figure "3" is projected onto the picture screen PS of FIG. 1B. Accordingly, the examples of FIG. 1A and FIG. 1B are the cases where the figures "2" and "3" are the patterns to be recognized.

By taking numerical count of the information data of each picture element on the picture screens PS of FIGS. 1A and 1B, to which the figures "2" and "3" are projected as binary values, and by obtainment of the weight total of the information data of each element groups from A to F by the system explained later herein, the results are illustrated on the table of FIG. 2. In other words, the pattern of the figure "2" on the picture screen PS is represented by the line or series formation of the total of information data 5, 1, 2, 4, 1, 6 while the pattern of the figure "3" on the picture screen PS is represented by the line or series information of the total of the information data 5, 1, 5, 1, 2, 5.

In the same manner, other figures, characters and so on can be projected on the picture screen PS, the corresponding line formation of the total of information data are placed in memory as references. While if an unknown pattern is projected onto the picture screen PS and such corresponding line formation of total of information data may be compared with the already memorized references, it is judged whether such unknown pattern is contained in the readily established memories or not. In this case, according to this invention, compared to the conventional methods, the information can be compressed which avails shorter processing time and for the same reason the circuitry construction therefor can be made simpler and it is easy to place the same into use.

Figure 3:
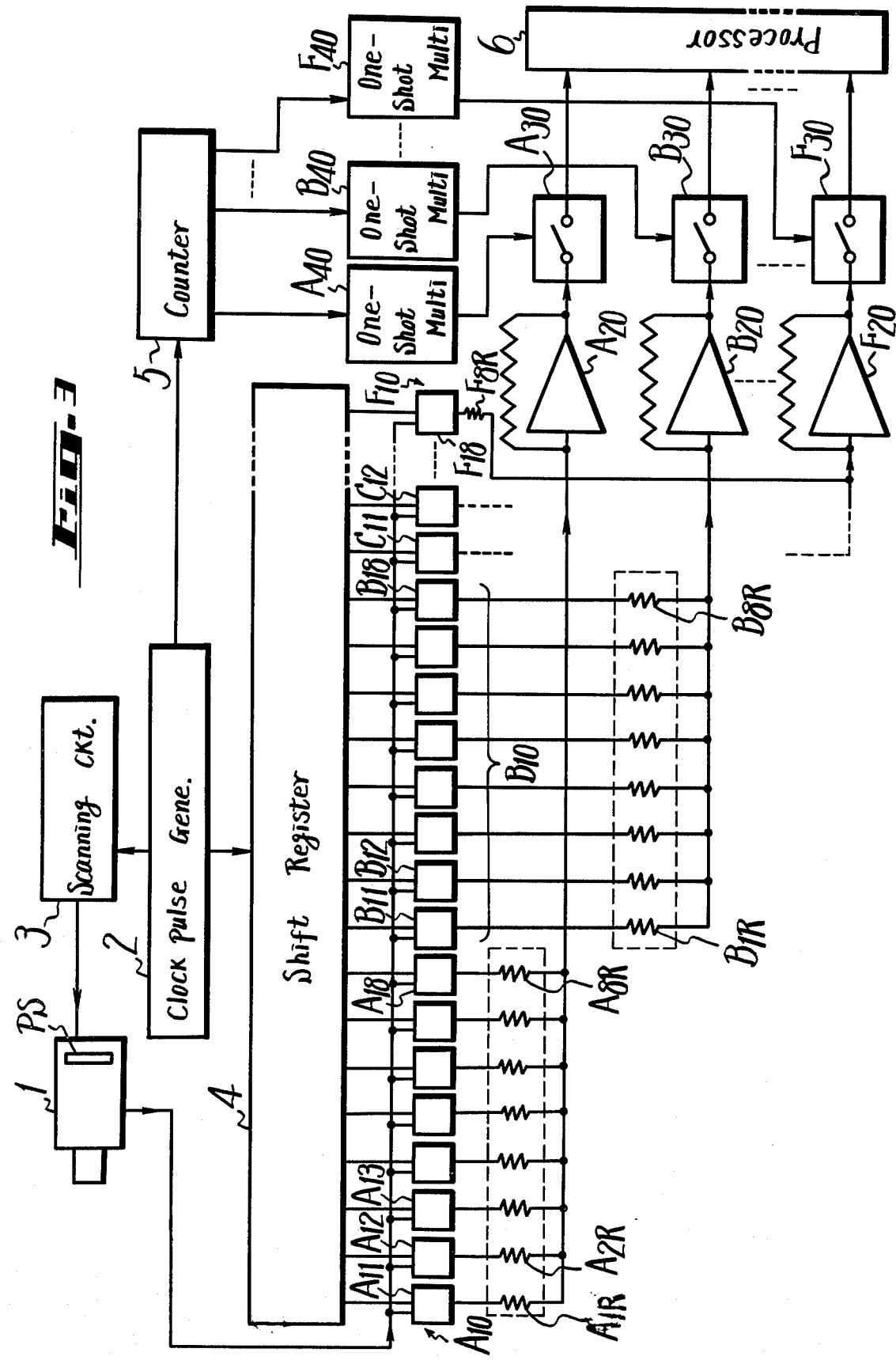
FIG. 3 illustrates a schematic diagram showing an example of the apparatus according to this invention.

As the next step, an example of a system to obtain the above mentioned line formation of totals of the information data will be explained in reference to FIG. 3. In FIG. 3, 1 designates, for instance, a television camera which, although the details are omitted from the drawing, includes, as its target, the picture screen PS containing picture elements as illustrated on FIG. 1: This television camera 1 picks up a pattern to be recognized and obtains a light image of the pattern on the picture screen PS. In FIG. 3, 2 indicates a clock pulse generator. When the clock pulses from generator 2 are fed into the camera 1 through a scanning circuit 3, the picture elements A1, A2 ... F7, F8 of the picture screen PS are scanned, for example, in sequence and the electrical outputs (informations) from the same are fed to analog memory elements A 11, A 12 ... A 18, B 11 ... B 18, C 11 ... C 18, D 11 ... D 18, E11 ... E 18, F 11 ... F 18 which are contained in analog memory groups A 10, B 10 ... F 10 which are provided in correspondence with picture element groups A through F containing picture elements A1, A2 ... F7, F8.

On the other hand, the output from the clock pulse generator 2 is also connected to a shift register 4 which provides signals in sequence to the analog memory elements A 11, A 12 ... F 17, F 18, so that they memorize the information from each of the picture elements from A1 ... F8 in sequence. Further, the clock pulse from generator 2 is also fed to a counter 5 which maintains a count on the clock pulses.

The outputs of the respective analog memory groups A 10, ... F 10 are fed to a processor 6 through corresponding process amplifiers A 20, ... F 20 and through analog switches A 30, ... F 30 as information totals for operational processing. The processor 6 is not directly related with this invention, so that the details thereof are omitted. The output from counter 5 is fed to the analog switches A 30, ... F 30 through one-shot multivibrators A 40, ... F 40 to control the switching operation of analog switches A 30, ... F 30, respectively.

In other words, in the case that camera 1 which includes the picture screen PS as its photo-electric conversion element, which picture screen PS contains the 6 picture element groups A, ... F which each contain 8 picture elements as illustrated in FIG. 1, is used, the counter 5 makes the analog switches A30, ... F 30 in sequence through one-shot multivibrators A 40 ... F40 each time the counter 5 counts 8 clock pulses. Accordingly, the information corresponding to the picture element groups A, ... F of the picture screen PS in the camera 1, which information is memorized in the analog memory groups A10, ... F 10, are fed to the processor 6 as the weight total outputs of the groups, respectively.

By such processing, the above mentioned line or series formations of the totals of the information are obtained at processor 6 and compared therein with reference one.

Now, the above case is such an instance where the electric information from each picture element is either "0" or "1", whereas in the case of FIG. 1A, the figure "2" is projected and the electric information of each element group shows a line or series information of 5, 1, 2, 4, 1, 6. In other words, in the case of FIG. 1A, the pattern is projected onto the picture elements A2, A3, A4, A5 and A7 from each of which an electric information of 1 is obtained, while no pattern is projected onto the picture elements A1.A6 and A8 from each of which an electric information of "0" is obtained which is equal to no information and as a total, an electric information of "5" is obtained as the total of picture element group A. However, if it is assumed that a pattern is projected onto the picture elements A1, A3, A4, A6 and A8 from each of which electrical information of "1" is obtained, while no projection on the other picture elements A2, A5 and A7 is made from each of which no electric information is obtained, which is a case that in spite of the projected pattern being different to the former case, the total of information from the picture element group A becomes "5" which is the same as the former case. Accordingly, in such case the pattern recognition is conducted in error.

However, if a proper weighting or weight attachment is made as an example, such as classifying the electric information of the picture elements A2, A4, A6 and A8 as 0.5 at element group A while the other picture elements are left as either "1" or "0", the case of FIG. 1A with projection of pattern on picture element A2, A3, A4, A5 and A7 while no projection on picture elements A1, A6 and A8 is made, the electric information becomes one line information of 0, 0.5, 1, 0.5, 1, 0, 1, 0 and hence the weighting total of element group A becomes "4". On the other hand, in the case of pattern projection on picture elements A1, A3, A4, A6 and A8 with no projection of pattern on picture elements A2, A5 and A7, the electrical information becomes the line information of 1, 0, 1, 0.5, 0, 0.5, 0, 0.5 which weighting total becomes 3.5 and is different from the former case. This means that a proper weight assignment to some of the picture element in each picture element group will show effect to segregate patterns that cannot be segregated without such weight assignment.

A system example, which conducts such weight assignment to some of the picture elements, shall be explained with reference to FIG. 3. At the output sides of analog memories A 11, A 12 ... F 18, resisters A 1R–A 8R, B 1R–B 8R, ... , F 1R–F8R, whose resistance values are selected to be different from one another according to the necessary weight assignments, are connected, and the output from analog memory elements A 11, ... F 18 are fed to processor 6 through these resisters A 1R ... F 8R and so on. Thus, the above mentioned weight assignment is accomplished.

Note that the above explanations is cited on the sequential scanning of a picture screen containing a number of picture element groups, but the scanning does not have to be limited to the sequential scanning and various other scanning methods may be adopted. Accordingly, it is not necessary to follow the sequential scanning arrangement for the construction of the element groups as well as distribution of picture elements, and for instance, as shown in FIG. 4, as indicated with +marks and O marks, the picture elements apart from each other may be assembled into element groups by which the same results are obtained, and it is not necessary to mention that the degree of pattern recognition can be raised by weight assignment to the proper picture elements. In the same respect, even though the picture element quantity, which constructs a picture screen as well as the element group construction or the scanning method may be properly selected, it is obvious to still obtain the same results.

It will be apparent that many modifications and variations could be effected by one skilled in the art without departing from the spirit or scope of the novel concepts of the present invention, so that the scope of the invention should be determined by the appended claims.

I claim as my invention:

1. A pattern matching method for recognizing a pattern on a picture screen using a television camera, said television camera producing an image of said picture screen, comprising the steps of:
   forming said pattern on said picture screen whereby said image contains said pattern;
   scanning said image in line sequence;
   dividing said image into a plurality of picture elements which are arranged in rows and columns;
   grouping said plurality of picture elements into a plurality of fixed groups of picture elements each group containing a plurality of contiguous picture elements, each group of picture elements including a plurality of contiguous picture elements over at least two adjacent rows, a last picture element of each group being contiguous with a first picture element of the next group;
   all groups having the same number of picture elements;
   electrically summing picture information in said picture elements of each of said groups of picture elements;
   comparing the respective sums from all of said groups of picture elements with corresponding stored sums corresponding to groups of picture elements of at least one reference pattern; and
   producing an electrical output indicating recognition of said pattern when the measured sums are substantially equal to the stored sums.

2. A pattern matching method as claimed in claim 1 further comprising the step of weighting at least one of said picture elements of each of said plural picture element groups.

3. The method recited in claim 1 further comprising weighting said picture information of at least one picture element before summing.

4. The method recited in claim 1 wherein said measuring of picture information comprises determining whether said brightness of each picture element is greater or less than a fixed brightness and generating a first fixed signal if it is less and a second fixed signal if it is greater than said fixed brightness.

5. An apparatus for electrically matching a pattern using a television camera which forms and scans an image of said pattern in line sequence, comprising:
   means including a picture screen for forming said pattern;
   means for defining a plurality of picture elements arranged in row and column into which said image is divided, said plurality of picture elements being grouped into a plurality of picture element groups each group containing a plurality of contiguous picture elements over at least two adjacent rows, the last picture element of one group being contiguous to the first picture element of the following group, all groups having the same number of picture elements;
   means for electrically summing picture information in said picture elements of each of said groups; and
   means for comparing the respective sums from all of said groups with corresponding stored sums corresponding to groups of picture elements in at least one reference pattern, said means for comparing having means to indicate whether said pattern projected on said picture screen is the same as said reference pattern.

6. An apparatus according to claim 5 further comprising means for weighting at least one of the picture elements of each of said picture element groups.

7. An apparatus as claimed in claim 6, wherein said means for weighting is a resistor.

8. The apparatus recited in claim 5 further comprising said screen being the target of said television camera.

9. The apparatus recited in claim 8 further comprising:
   (a) sequential scanning means for said television camera for generating a video signal;
   (b) discrete regions of said target being said picture elements;
   (c) a shift register connected to said video signal and having a plurality of outputs;
   (d) a plurality of memory elements connected in one-to-one relationship to the outputs of said shift register;
   (e) said shift register connecting said video signal to one memory element at a time whereby each memory element stores the video signal from one of said discrete regions.

10. The apparatus recited in claim 9 wherein said means for electrically summing includes:
    (a) first means for electrically summing the outputs of a first group of said memory elements;
    (b) second means for electrically summing the outputs of at least a second group of said memory elements;
    (c) means for connecting outputs of said first and second means for electrically summing to said means for comparing.

11. The apparatus recited in claim 10 wherein said means for connecting includes switches.

12. The apparatus recited in claim 11 further comprising a clock pulse generator, said clock pulse generator being operative to control said sequential scanning means, said shift register and said switches.

* * * * *